(12) United States Patent
Shimizu

(10) Patent No.: US 7,523,239 B2
(45) Date of Patent: Apr. 21, 2009

(54) BUS COMMUNICATION SYSTEM

(75) Inventor: Ryo Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 240 days.

(21) Appl. No.: 11/711,180

(22) Filed: Feb. 26, 2007

(65) Prior Publication Data
US 2007/0204082 A1 Aug. 30, 2007

(30) Foreign Application Priority Data
Feb. 28, 2006 (JP) ............................. 2006-052358

(51) Int. Cl.
*G06F 13/00* (2006.01)
(52) U.S. Cl. .................. 710/110; 710/316; 710/317
(58) Field of Classification Search ................. 710/110, 710/309–317; 701/45, 201, 207, 209, 211, 701/213–215, 301; 714/48, 50–51, 56
See application file for complete search history.

(56) References Cited
U.S. PATENT DOCUMENTS

| | | | | |
|---|---|---|---|---|
| 5,076,375 A | * | 12/1991 | Dillon et al. ................... | 177/45 |
| 5,333,675 A | * | 8/1994 | Mullis et al. ................. | 165/268 |
| 6,397,280 B1 | | 5/2002 | Nitschke et al. | |
| 6,744,376 B1 | * | 6/2004 | Pascalidis .............. | 340/870.21 |
| 6,745,270 B1 | * | 6/2004 | Barenys et al. .............. | 710/104 |
| 7,085,863 B2 | * | 8/2006 | Barenys et al. .............. | 710/104 |
| 7,304,566 B2 | * | 12/2007 | Mae et al. .................... | 340/436 |

FOREIGN PATENT DOCUMENTS

| | | |
|---|---|---|
| JP | 2004-284382 | 10/2004 |
| JP | 2006-304069 | 11/2006 |

* cited by examiner

*Primary Examiner*—Raymond N Phan
(74) *Attorney, Agent, or Firm*—Harness, Dickey & Pierce, PLC

(57) ABSTRACT

A bus communication system is equipped with an operation scheme based on a trouble detection method that prevents a halt of the entire bus communication system by partially operating the system with the enforcement of operation prohibition for a troubled part. The troubled part in a daisy chain network of a master unit and slave units is detected and identified based on response signals from the slave units when the slave units respectively acquire their IDs.

12 Claims, 7 Drawing Sheets

BUS COMMUNICATION SYSTEM

CROSS REFERENCE TO RELATED APPLICATION

This application is based on and claims the benefit of priority of Japanese Patent Application No. 2006-52358 filed on Feb. 28, 2006, the disclosure of which is incorporated herein by reference.

FIELD OF THE INVENTION

The present invention generally relates to a bus communication system having a master device and plural slave devices in a daisy chain connection.

BACKGROUND INFORMATION

In recent years, an occupant protection system for use in a vehicle is developed and is disclosed in, for example, Japanese patent document JP-A-2004-284382. The occupant protection system is used for protecting the occupant of the vehicle when the vehicle collides with an object. The system disclosed in the above-identified document includes a control device and plural collision detection sensors that are interconnected with each other in a daisy chain connection.

Each of the plural collision detection sensors on a network stores a unique ID number for distinguishing itself from other sensors. However, the unique ID number for each of the plural collision detection sensors is assigned to the sensor after installation to the vehicle because of the requirement of production procedure or the like. That is, the unique ID number is assigned to the sensor as an initial configuration setting when the system is initialized by a control device.

The collision detection sensors 5-7 of the occupant protection system are, for example, configured to form a network as shown in an illustration in FIG. 3. That is, the collision detection sensors 5-7 include communication circuits 5a-7a that exchanges signals with a control device 2 (i.e., Airbag ECU in FIG. 3), bus switches 5b-7b that connect/disconnect communication between a preceding device and a subsequent device in the daisy chain connection, acceleration sensors 5c-7c, and RAMs 5d-7d that store unique IDs.

In the initial configuration setting, the control unit 2 conducts the following steps in a sequence. That is, the control unit 2 sequentially outputs ID assign signals to the sensors 5-7 in order from the preceding one toward the subsequent one, and sequentially controls the bus switches 5b-7b to connect to the network. More practically, the control unit 2 outputs the ID assign signal to the first collision detection sensor 5 that is directly connected to the control unit 2, and then the first sensor 5 stores the first ID in the RAM 5d. Further, the bus switch 5b of the first sensor 5 is turned on for connecting the control unit 2 and the second collision detection sensor 6. Then, the control unit 2 repeatedly conducts the same procedure of ID assignment, ID storage and bus switch control on the RAMs 6d, 7d and switches 6b, 7b. In this manner, the all of the sensors 5-7 acquires unique IDs and stores them.

In this configuration, trouble of the bus switches 5b-7b is detected based on a comparison of the number of the sensors in the control unit 2 and the number of the assigned IDs distributed by the control unit 2. That is, when the number of the IDs are identical with the number of the sensors, the bus switches 5b-7b are determined to be correctly operating, and when the number of the IDs are smaller than the number of the sensors, the trouble of the bus switches 5b-7b is detected. The trouble of the switches 5b-7b can be detected in this manner, because, for example, the switch having a short-circuit trouble or an open-circuit trouble can not receive a unique ID properly.

More practically, when the bus switch 5b in FIG. 3 has a trouble at a time of the initial configuration setting, the ID assign signal for the first sensor 5 is also transmitted to the second sensor 6. Therefore, the first and the second sensors 5, 6 have the same ID. After that, the subsequent sensors 7 may have the other ID. However, the number of the sensors stored in the control unit 2 does not become the same number as the number of the IDs for the sensors. That is, the number of the IDs becomes smaller than the number of the sensors 5-7 by 1. As a result, the control unit 2 can detect the trouble of at least one of the bus switches 5b-7b in the plural sensors 5-7.

Furthermore, when bus switch 5b has an open-circuit trouble, the subsequent sensors 6, 7 that is connected on a downstream side of the bus switch 5b can not have the signal. Therefore, even in the case of the open-circuit trouble, the number of the IDs becomes fewer than the number of the sensors. As a result, the control unit 2 can detect an occurrence of the trouble in at least one of the bus switches 5b-7b.

However, the trouble detection in the above-described manner can only detect the occurrence of the trouble among the bus switches, without having any clue that the trouble is the short-circuit trouble or the open-circuit trouble. Further, the position of the troubled switch cannot be determined. Therefore, operation of the entire occupant protection system is halted when the trouble is detected for preventing malfunction of the occupant protection system.

SUMMARY OF THE INVENTION

In view of the above and other problems, the present invention provides a bus communication system having a master unit and plural slave units in a daisy chain connection for preventing a halt of the entire bus communication system and related systems dependent on the bus communication system by using an improved trouble detection method that enables a partial operation of the bus communication system even when a trouble is detected in the bus communication system.

The bus communication system includes a switch device in each of the slave units for switching between connection and disconnection of communication that is established between one of the master unit and the slave unit on a preceding side of the daisy chain connection relative to the switch device and the slave unit on a subsequent side of the daisy chain connection relative to the switch device upon having an input of a switch signal outputted by the master unit, an ID acquisition device in each of the slave units for acquiring an ID upon having an ID acquisition signal outputted by the master unit on a condition that the switch device in the slave unit on the preceding side of the daisy chain connection is switched to connection of communication, and a trouble detection device in the master unit for detecting a trouble of the switch device. The ID acquisition device outputs to the master unit an electric current response signal in response to the ID acquisition signal when the ID acquisition signal is inputted to the ID acquisition device, and the master unit detects the trouble of the switch device in the slave unit by using the trouble detection device based on the response signal outputted by the ID acquisition device. The trouble detection unit detects at least one of a short-circuit trouble and an open-circuit trouble of the switch device.

Then, the switch device of the first slave unit is turned on (i.e., in a closed condition). Then, the second ID acquisition signal from the master unit is transmitted the first and second slave unit due to the turn-on of the switch device in the first slave unit. At this point, the second slave unit is the only slave unit that does not have acquired the ID. Therefore, the second slave unit acquires the second ID when the second ID acquisition signal from the master unit is inputted. The other slave units on the subsequent side in the daisy chain connection acquire the unique ID in the same manner.

A unique ID for each of the ID acquisition devices is provided in the following manner. That is, the switch device in the all slave unit is tuned off (i.e., in an open condition) in an initial condition, thereby providing connection only between the master unit and the first slave unit. Therefore, the ID acquisition signal from the master unit is transmitted only to the first slave unit. As a result, the ID acquisition signal is inputted only to the first slave unit for acquiring the first ID.

Then, the switch device of the first slave unit is turned on for connecting the communication between the slave unit that is on the subsequent side of the first slave unit. In this case, the mater unit and the first/second slave units are connected. Then, the second ID acquisition signal is outputted from the master unit. At this point, the second slave unit is the only slave unit that does not have the ID. Therefore, the second ID acquisition signal is inputted to the second slave unit, and the second slave unit acquires the second ID. In this manner, the other slave units on the subsequent side in the daisy chain respectively acquire unique IDs.

The ID acquisition device is configured to output an electric current response signal to the master unit in response to the ID acquisition signal. For example, the ID acquisition device in the first slave unit outputs the first response signal to the master unit in response to the first ID acquisition signal right after the output of the first ID acquisition signal when all switch devices are turned off. The ID acquisition device in the second slave unit respond to the second ID acquisition signal in the same manner when the switch device in the first slave unit is turned on. That is, the second response signal is outputted from the ID acquisition device when the second slave unit.

That is, the master unit has the input of the response signal from the first slave unit in response to the first ID acquisition signal right after the first ID acquisition signal is outputted when the switch device is working properly, and has the input of the response signal from the second slave unit in response to the second ID acquisition signal right after the second ID acquisition signal is outputted. More practically, the input of the response signal to, the master unit always has the maximum value that corresponds to the maximum value of the ID acquisition signal outputted by a single ID acquisition unit in one of the slave units when the switch device is in normal condition.

However, when the second slave unit has a short-circuit trouble in the switch device, the second ID acquisition signal is inputted both of the second and the third slave units. Therefore, the master unit has the response signals from both of the second and the third slave units after outputting the ID acquisition signal. As a result, magnitude the electric current value of the response signal is twice the value of the response signal of the normal response signal at maximum because of overlapping of two response signals. In this manner, the short-circuit trouble of the switch device is detected based on the electric current value of the response signal.

Therefore, the trouble detection device can detect the short-circuit trouble of the switch device when, for example, the electric current value of the response signal is greater than a first threshold. Further, the electric current value of the response signal is examined as a bit data when the response signal is coded as the digital signal of the electric current. That is, because the ID bits of the response signal from two ID acquisition device take the same form for the above-described reason in case of the short-circuit trouble of the switch device, the electric current of the response signal is substantially doubled, thereby enabling the detection of the short-circuit trouble.

The magnitude of the increase of the electric current of the response signal is substantially in proportion to the number of the switch devices in trouble. Therefore, the first threshold takes multiple values for detecting the number of the switch devices having the short-circuit trouble. More practically, the maximum value of the electric current of the response signal is substantially twice the value of the normal electric current value in the response signal when a single switch device has the short-circuit trouble, and the maximum electric current value is substantially three times the value of the normal signal when two successive switch devices have the short-circuit trouble. Therefore, the trouble detection condition for short-circuit trouble of the single switch device can be defined as the first threshold of the electric current value greater than the normal value (i.e., the first value of the first threshold) and equal to or smaller than twice the value (i.e., the second value of the first threshold) of the normal signal. The short-circuit trouble of the two switch devices can then be detected by using the second value of the first threshold and the third value of the first threshold (i.e., three times the value of the normal signal).

Further, the trouble detection device detects the position of the short-circuit trouble based on the response signal. That is, the switch device in the slave unit that includes the ID acquisition device that has outputted the response signal having the value greater than the first threshold is determined as the position of the short-circuit trouble. More practically, when the first ID acquisition signal is responded by the response signal having the value that is greater than the first threshold, the switch device in the first slave unit is determined to have the short-circuit trouble.

Furthermore, when the position of the short-circuit trouble is detected, the master unit can keep the operation of the bus system by prohibiting the use of the slave units that are affected by the detected short-circuit trouble.

Furthermore, the open-circuit trouble of the switch device can be detected by examining the absence of the response signal from the ID acquisition signal. In addition, the position of the open-circuit trouble can be determined as the position of the switch device that is included in the slave unit on the preceding side of a response output slave unit that is expected to output the response signal in response to the ID acquisition signal for a predetermined period.

Furthermore, when the position of the open-circuit trouble is detected, the master unit can keep the operation of the bus system by prohibiting the use of the slave units that are affected by the detected short-circuit trouble.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention are described with reference to the accompanying the drawings.

Figure 1:
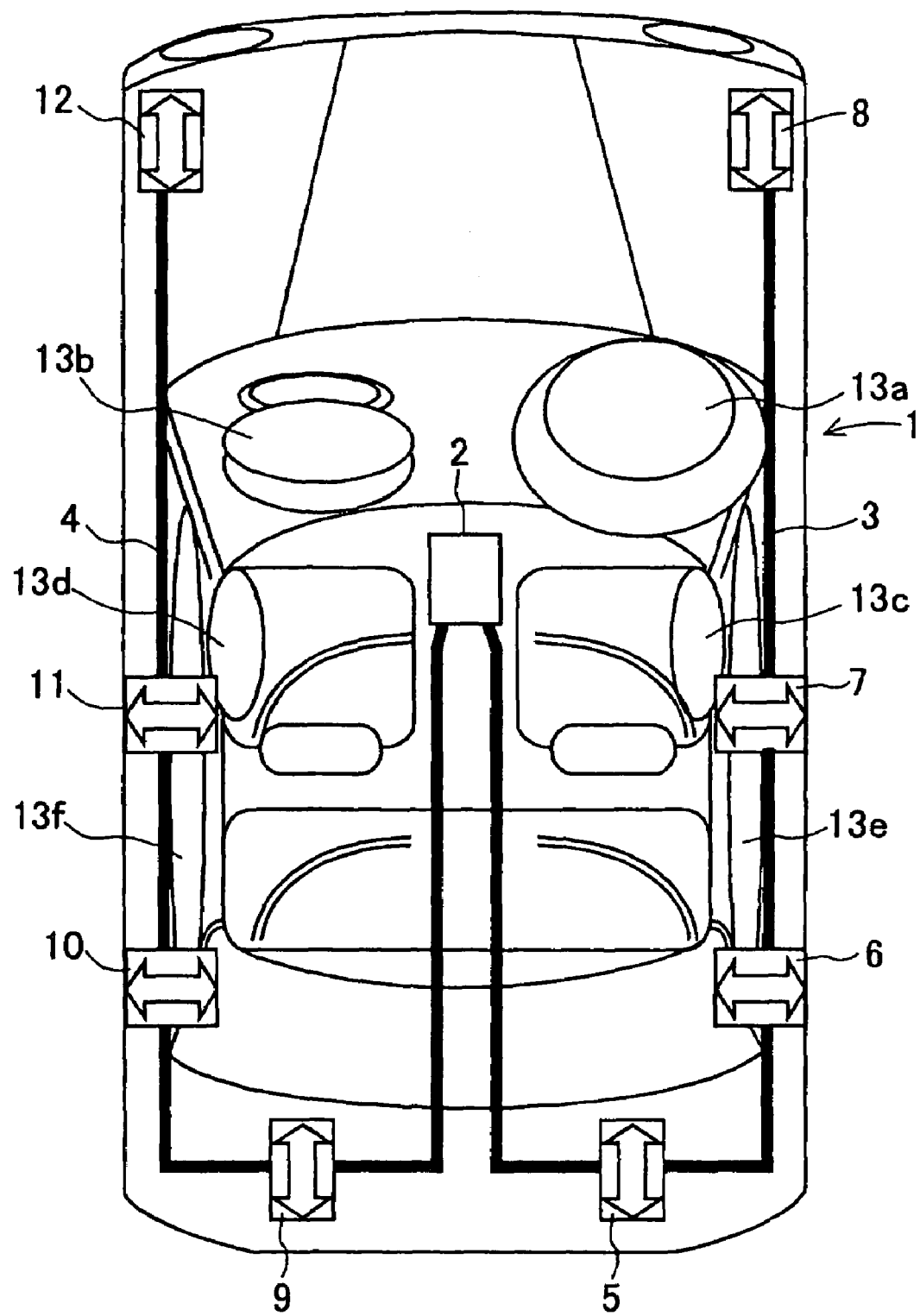
FIG. 1 shows an illustration of an airbag system in an embodiment of the present disclosure.

FIG. 1 shows an illustration of an airbag system in an embodiment of the present disclosure. The airbag system 1 includes an airbag ECU 2, communication buses 3, 4, slave sensors 5-12, a front airbag 13a for a driver's seat, a front airbag 13b for a navigator's seat, side airbags 13c, 13d, and curtain airbags 13e, 13f.

The airbag ECU 2 is used for deployment of the airbags 13a-13f based on acceleration detected by a sensor 23 in a vehicle and slave sensors 5-12. The airbag ECU 2 is disposed substantially at a center of the vehicle.

The communication bus 3 is a power/signal line for exchanging an ID signal, an instruction signal, and data between the airbag ECU 2 and slave sensors 5-8 as well as providing electricity to the slave sensors 5-8. The communication bus 4 is a power/signal line for exchanging an ID signal, an instruction signal, and data between the airbag ECU 2 and slave sensors 9-12 as well as providing electricity to the slave sensors 9-12.

The slave sensors 5-12 detect acceleration of various parts of the vehicle, and output detection results via the communication buses 3, 4, in response to a data transmission request from the airbag ECU 2.

The slave sensor 5 is disposed at a right rear side of the vehicle for detecting acceleration in a front-rear direction of the vehicle. The slave sensor 5 is directly connected to the airbag ECU 2. The slave sensor 6 is disposed at a proximity of a C pillar on the right side of the vehicle for detecting acceleration in a right-left direction of the vehicle. The slave sensor 6 is connected to the airbag ECU 2 through the slave sensor 5. The slave sensor 7 is disposed at a proximity of a B pillar on the right side of the vehicle for detecting acceleration in a right-left direction of the vehicle. The slave sensor 7 is connected to the airbag ECU 2 through the slave sensors 5, 6. The slave sensor 8 is disposed at a front right side of the vehicle for detecting acceleration in a front-rear direction of the vehicle. The slave sensor 8 is connected to the airbag ECU 2 through the slave sensors 5-7. That is, the slave sensors 5-8 are connected to the airbag ECU 2 in a daisy chain configuration.

Figure 2:
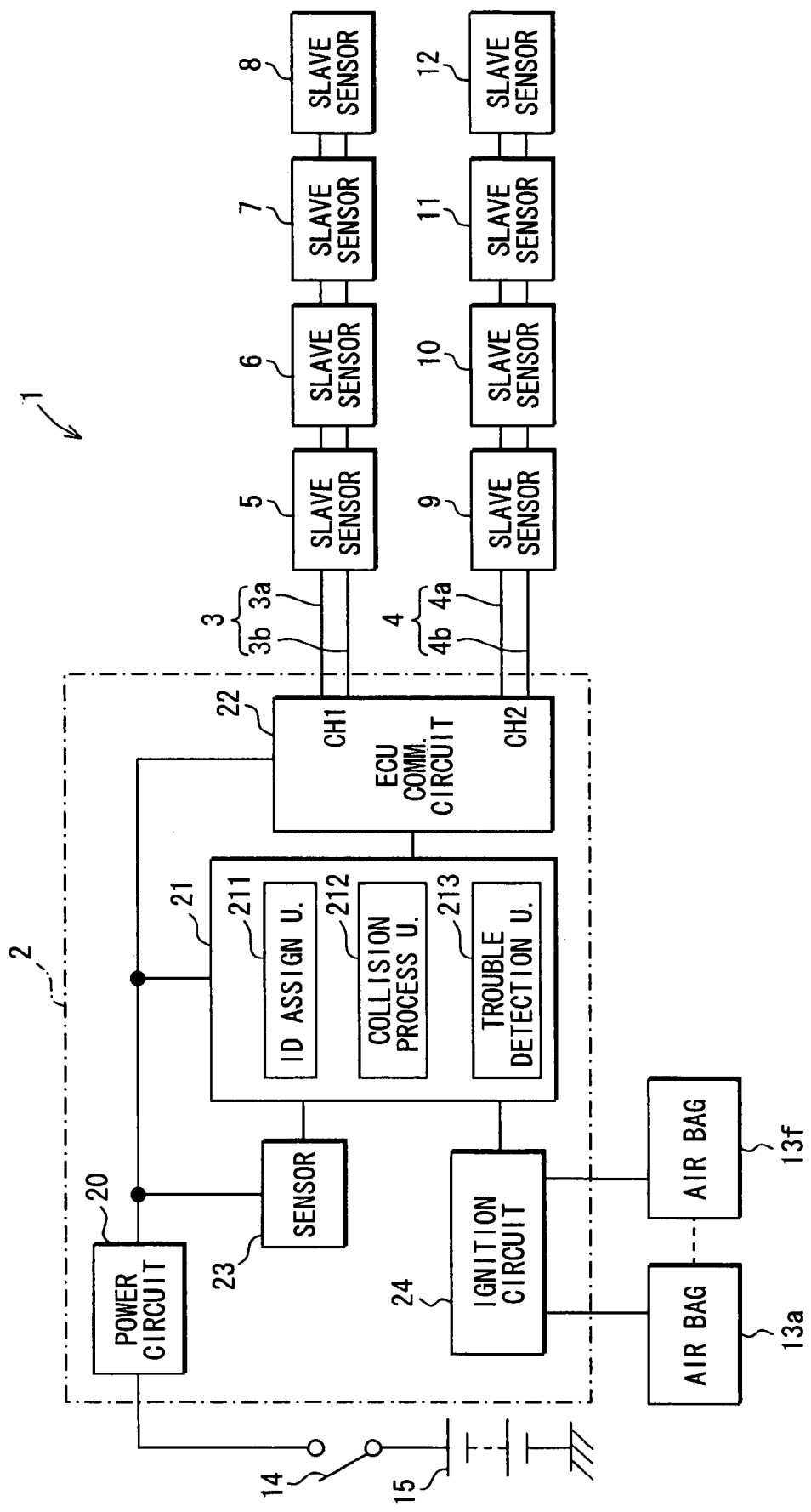
FIG. 2 shows a block diagram of the airbag system.

FIG. 2 shows a block diagram of the airbag system 1. The airbag ECU 2 includes a power circuit 20, a center control circuit 21, an ECU communication circuit 22, a sensor 23, and an ignition circuit 24.

The power circuit 20 converts an output voltage of a battery 15 provided through an ignition switch 14 to a power voltage that suitably operates the center control circuit 21, the ECU communication circuit 22, and the sensor 23. An input terminal of the power circuit 20 is coupled with a cathode terminal of the battery 15 through the ignition switch 14. An output terminal of the power circuit 20 is each of power terminals of the center control circuit 21, the ECU communication circuit 22, and the sensor 23. A negative terminal of the battery 15 is coupled with a vehicle body that serves as a ground.

The center control circuit 21 includes an ID assign unit 211, a collision process unit 212, and a trouble detection unit 213.

The ID assign unit 211 assigns each of the slave sensors 5-12 a unique ID in an initialization setting process just after starting operation, that is, after the ignition switch 14 is turned on. The ID assignment process is described later in detail.

The collision process unit 212 collects acceleration data from the slave sensors 5-12 through the communication circuit 22 and the buses 23, 24. It also collects acceleration data from the sensor 23. Then, the collision process unit 212 determines deployment of each of the airbags 13a-13f based on the collected acceleration data. The determination of airbag deployment is designated as collision detection hereinafter. Then, the ignition circuit 24 is controlled based on a result of the collision detection. The collision process unit 212 conducts the collision detection based on the acceleration data from one of the slave sensors 5-12 when the trouble detection unit 213 conducts a trouble-related prohibition process. The process in the collision process unit 212 is described later in detail.

The trouble detection unit 213 detects a trouble of a bus switch in the slave sensors 5-12. The trouble of the bus switch is either of a short-circuit trouble or an open-circuit trouble. The process in the trouble detection unit 213 is described later in detail.

The ECU communication circuit 22 provides electric power to the slave sensors 5-12 through the buses 3, 4. Further, the communication circuit 22 exchanges various signals such as an ID assign signal, an ID acquisition signal I (a capital of an 'i'), a data transmission request signal, and an acceleration data signal to and from the slave sensors 5-12. The various signals transmitted from the communication circuit 22 to the sensors 5-12 are digitally coded in various voltage values. On the other hand, the various signals transmitted from the slave sensors 5-12 to the communication circuit 22 are digitally coded in various current values. In this manner, transmission of digital voltage signals from the communication circuit 22 and reception of digital current signals by the communication circuit 22 take place simultaneously.

The sensor 23 is disposed in the airbag ECU 2, detect acceleration in a front-rear direction, and outputs acceleration data to the collision process unit 212 in the center control unit 21. The ignition circuit 24 is used to deploy selected airbags among the airbags 13a-13f based on an ignition signal outputted by the collision process circuit. The communication buses 3, 4 includes high-side communication buses 3a, 4a that transmits the digital voltage signal from the communication circuit 22 and low-side communication buses 3b, 4b that transmits the digital current signal from the slave sensors 5-12 to the communication circuit 22.

Figure 3:
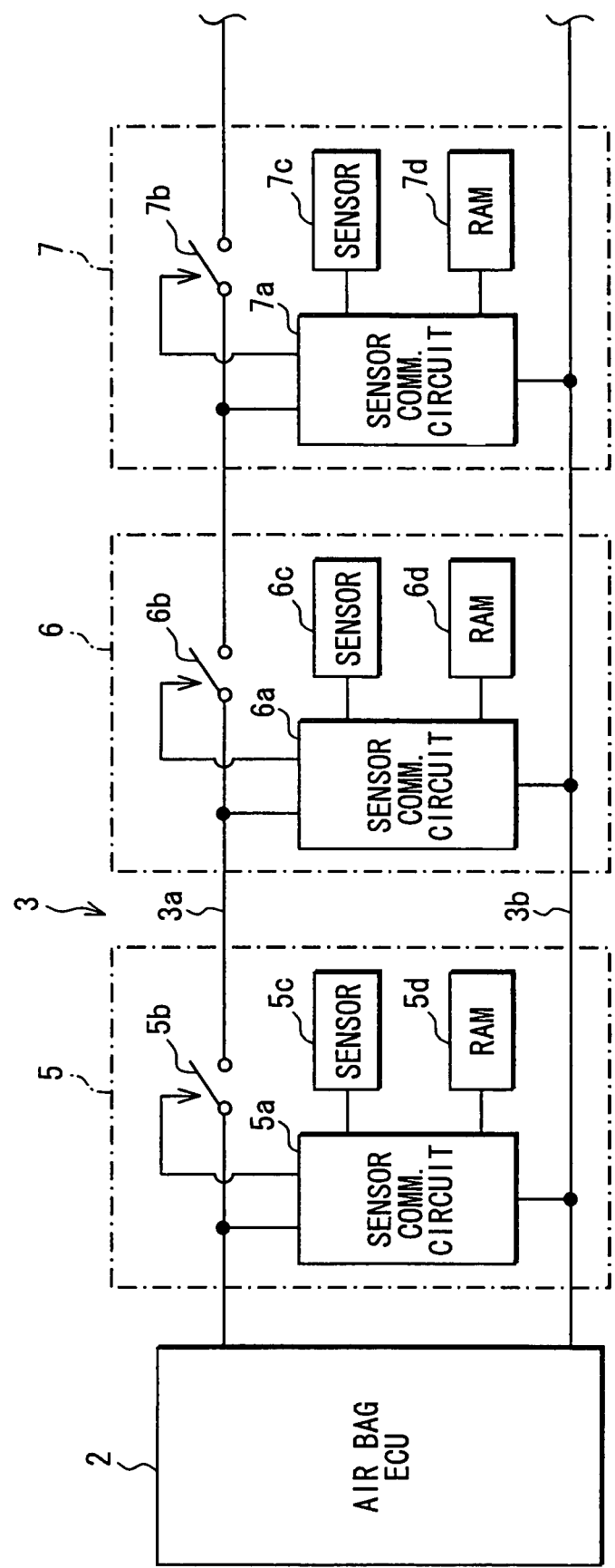
FIG. 3 shows a block diagram of slave sensors of the airbag system.

FIG. 3 shows a block diagram of slave sensors 5-7 of the airbag system 1. The slave sensors 5-12 are configured in the same manner. Therefore, configuration of the slave sensor 5 only is described here.

The slave sensor 5 includes the a sensor communication circuit 5a, a bus switch 5b, a sensor 5c, and a RAM 5d.

The upper end of the sensor communication circuit 5a is coupled with the high-side communication bus 3a, and the lower end of the sensor communication circuit 5a is coupled with the low-side communication bus 3b. The sensor communication circuit 5a provides electric power from the communication circuit 22 for the sensor 5c and the like through the high-side communication bus 3a. Further, the sensor communication circuit 5a stores an ID in the RAM 5d (detail description is given later) and transmits the ID acquisition signal I to the ECU communication circuit 22 when the ID assign signal is inputted from the ECU communication circuit 22 through the high-side communication bus 3a. Furthermore, the sensor communication circuit 5a has an input of the acceleration data from the sensor 5c when the data transmission request signal is inputted from the ECU communication circuit 22. Then, the acceleration data from the sensor 5c is transmitted to the ECU communication circuit 22 through the low-side communication bus 3b. Furthermore, the sensor communication circuit 5a turns on and off the bus switch 5b based on a signal inputted from the communication circuit 22.

One end of the bus switch 5b (on a left side of FIG. 3) is coupled with the high-side communication bus 3a that is directly coupled with the communication circuit 22, and the other end of the bus switch 5b (on a right side of FIG. 3) is coupled with the high-side communication bus 3a that couples the slave sensor 5 with the slave sensor 6 on a subsequent side. That is, the bus switch 5b is a switch that connects and disconnects the ECU communication circuit 22 on a preceding side and the slave sensor 6 on the subsequent side. In addition, one end of the bus switch 5b is coupled with the upper end of the sensor communication circuit 5a. Therefore, the bus switch 5b of the slave sensor 5 enables communication between the ECU communication circuit 22 and the sensor communication circuit 6a in the slave sensor 6 that is on the subsequent side. The bus switch 5b switches on and off based on an instruction from the sensor communication circuit 5a.

The sensor 5c detects acceleration, and outputs acceleration data to the sensor communication circuit 5a. The RAM 5d sensor stores the ID that is assigned by the sensor communication circuit 5a when the sensor communication circuit 5a inputs the ID assign signal.

In this case, on the subsequent side of the slave sensor 5, the slave sensor 6 having the same configuration is coupled through the high-side communication bus 3a and the low-side communication bus 3b. Further, on the subsequent side of the slave sensor 6, the slave sensor 7 having the same configuration is coupled through the high-side communication bus 3a and the low-side communication bus 3b. Furthermore, on the subsequent side of the slave sensor 7, the slave sensor 8 having the same configuration is coupled through the high-side communication bus 3a and the low-side communication bus 3b. The slave sensors 9-12 are coupled in the same manner as the slave sensors 5-8.

Figure 4:
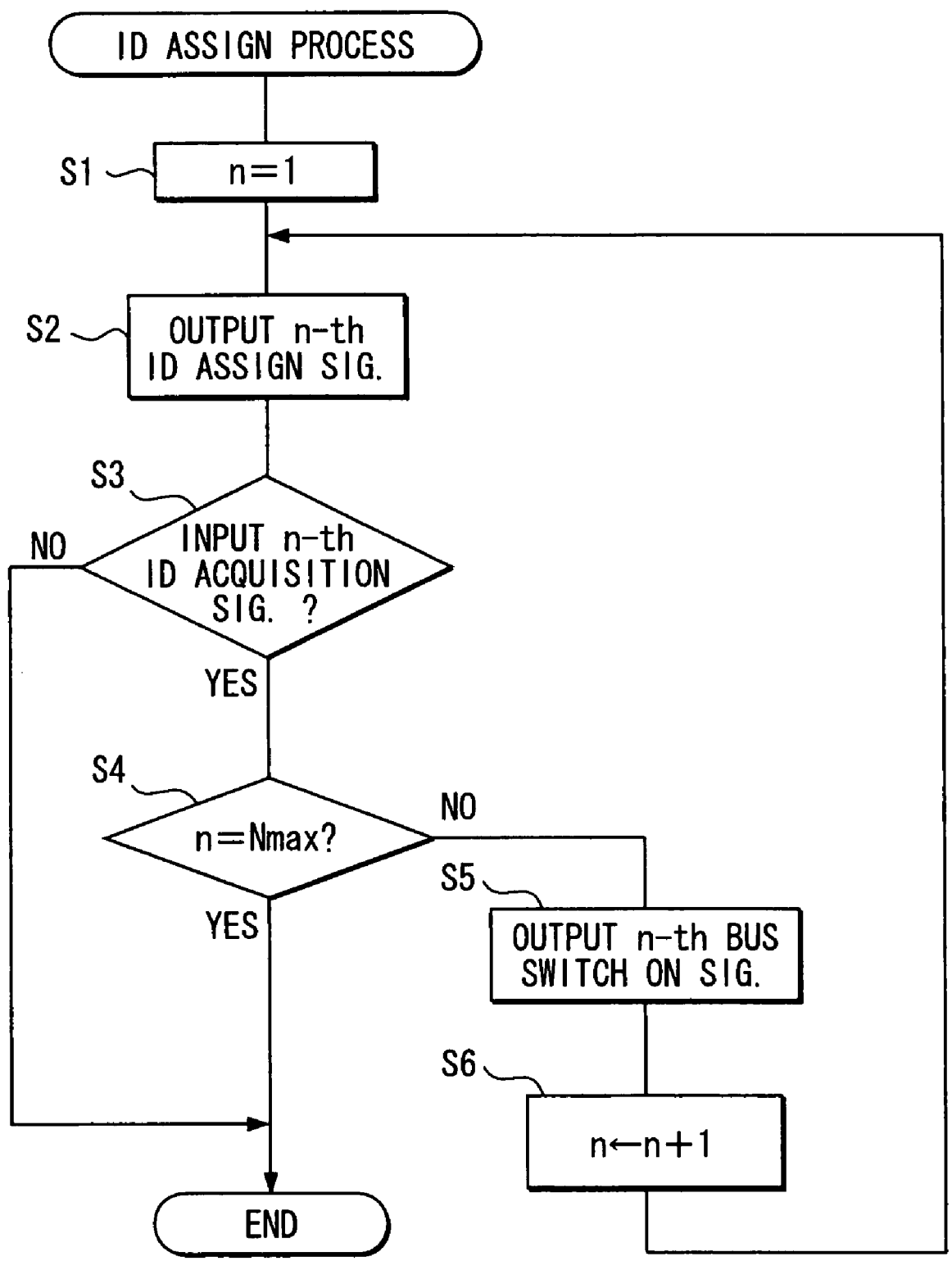
FIG. 4 shows a flowchart of an ID assignment process by an ID assign unit.
Figure 5:
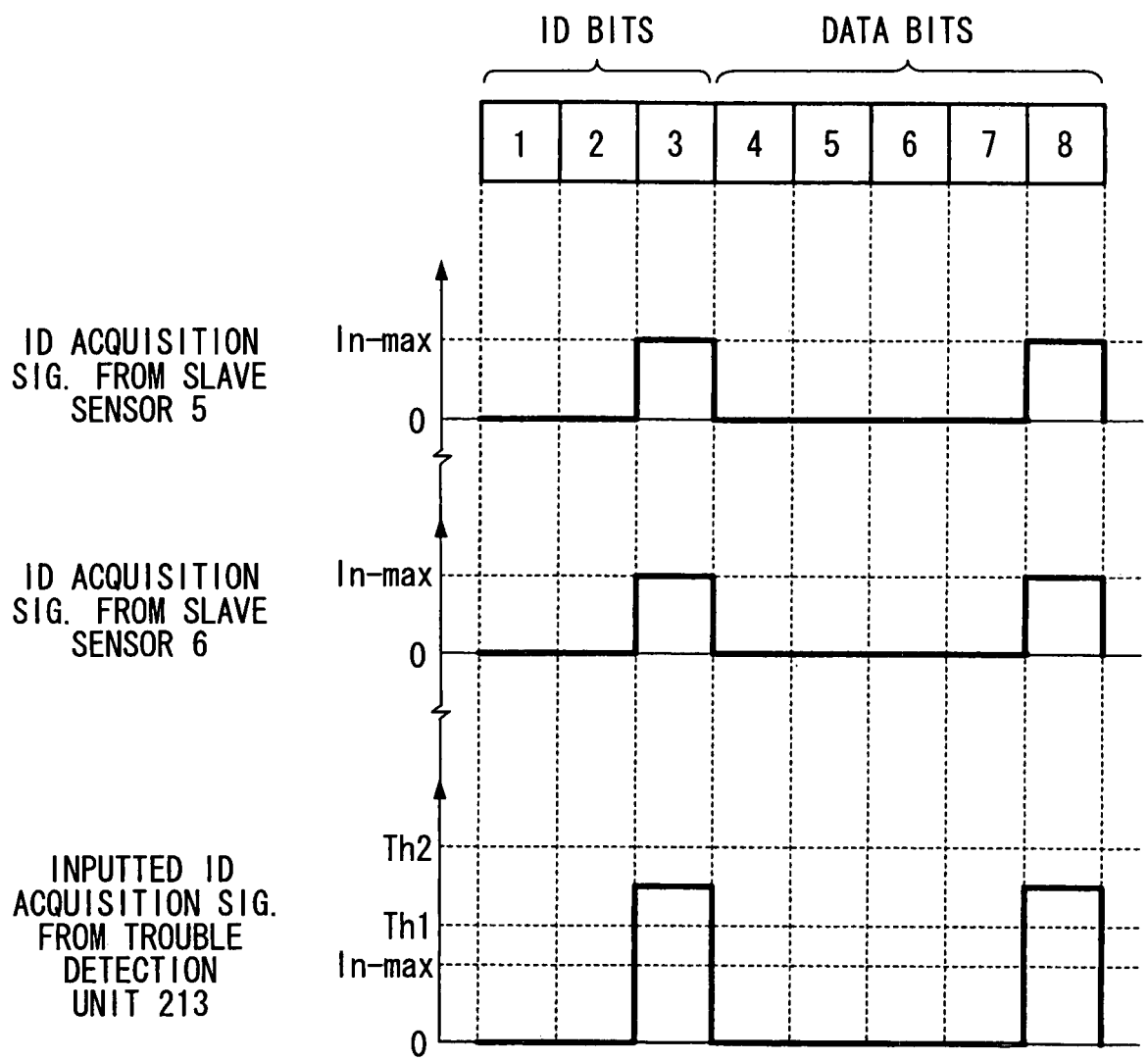
FIG. 5 shows an illustration of an ID assign signal.
Figure 6:
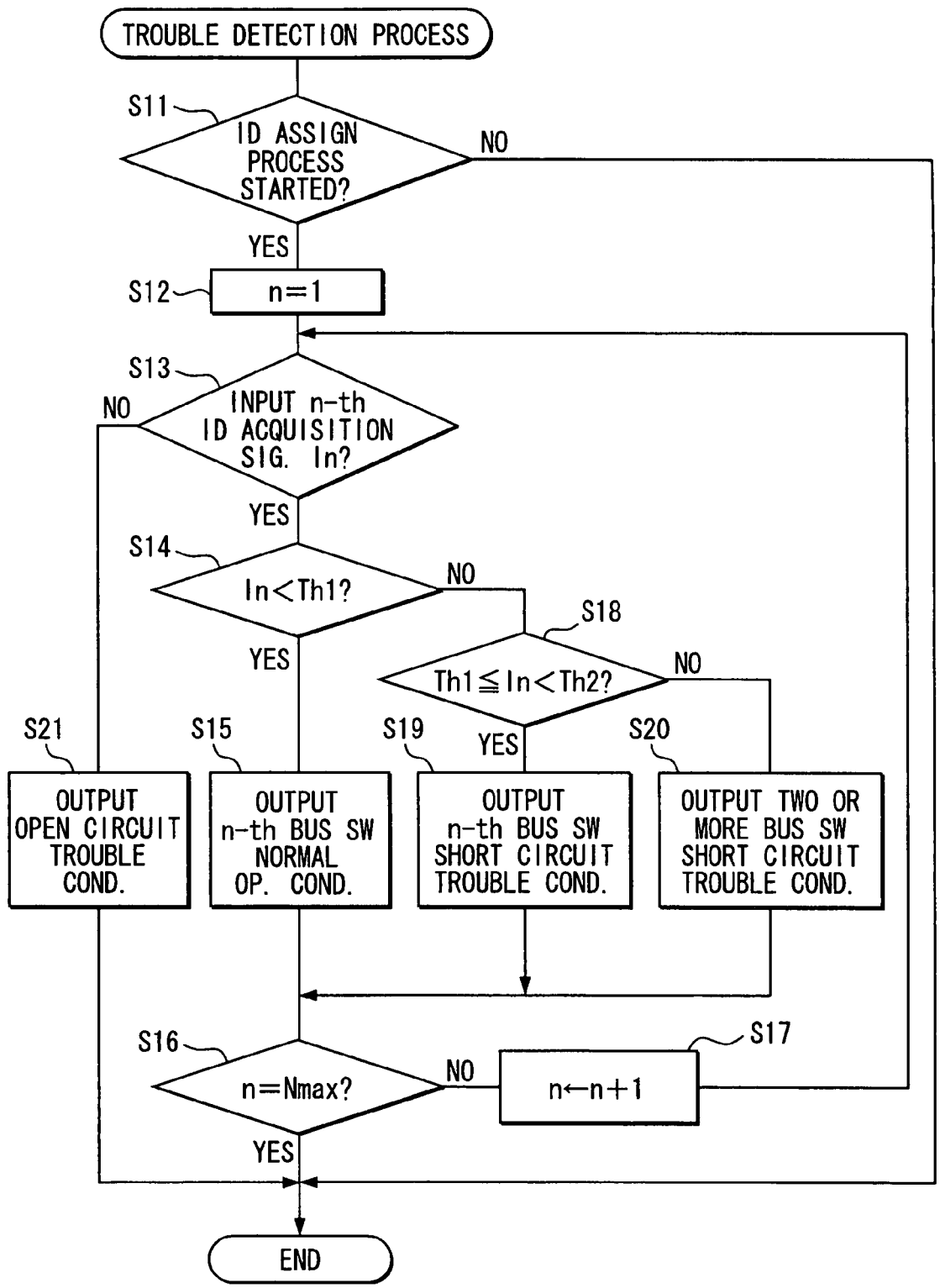
FIG. 6 shows a flowchart of a trouble detection process by a trouble detection device.
Figure 7:
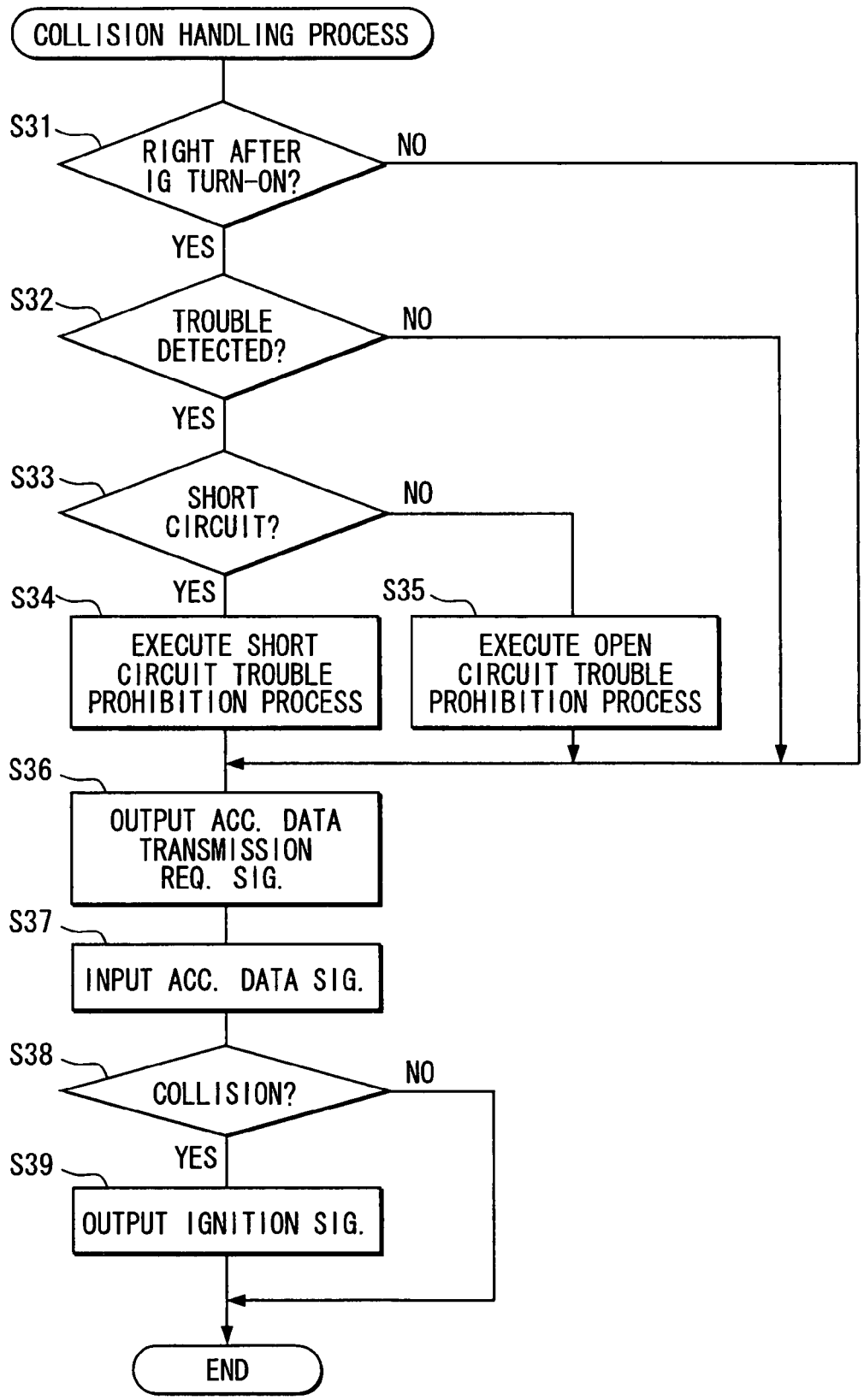
FIG. 7 shows a flowchart of a collision handling process by a collision process unit.

Operation of the airbag system 1 is described with reference to FIGS. 2 to 7. FIG. 4 shows a flowchart of an ID assignment process by an ID assign unit 211. FIG. 5 shows an illustration of an ID assign signal. FIG. 6 shows a flowchart of a trouble detection process by a trouble detection unit 213. FIG. 7 shows a flowchart of a collision handling process by a collision process unit 212.

The power circuit 20 provides an output power of the battery 15 for the center control circuit 21, the ECU control circuit 22, and the sensor 23 after converting the electric power that is suitable for the operation of those components when the ignition switch 14 is turned on. When the electric power is supplied to those component, the bus switches 5b-12b in the slave sensor 5-12 are all turned off.

Then, the ID assign unit 211 in the center control circuit 21 executes the ID assignment process for the slave sensors 5-12. The process is described with reference to FIG. 4.

The process initializes a counter n to 1 in step S1. Then, the process in the ID assign unit 211 outputs the ID assign signal for the n-th ID through a channel CH1 and the high-side communication bus 3a of the ECU communication circuit 22 in step S2. When the ID assign signal is outputted, all of the bus switches 5b-12b are turned off. Therefore, the first ID assign signal from the ID assign unit 211 is transmitted only to the slave sensor 5. Then, the sensor communication circuit 5a in the slave sensor 5 acquires the first ID, and stores the first ID in the RAM 5d. Then, the sensor communication circuit 5a outputs the ID acquisition signal I1 that indicates the acquisition of the first ID to the communication circuit 22 through the low-side communication bus 3b.

The ID acquisition signal is now described with reference to FIG. 5. The sensor communication circuit 5a in the slave sensor 5 outputs, for example, the ID acquisition signal I1 that is coded as a digital current signal of 8 bits to the ECU communication circuit 22 as shown as an upper most illustration in FIG. 5. The upper 3 bits of the signal I are used as ID bits, and the lower 5 bits are used as data bits. Therefore, the first ID acquisition signal I1 has, as illustrated as the first signal form in FIG. 5, the ID bits of "001" and the data bits of "00001."

Then, the ID assign unit 211 determines whether the n-th ID acquisition signal In is inputted in step S3. In this case, the first ID acquisition signal I1 is inputted from the slave sensor 5. When the ID assign unit 211 inputs the ID acquisition signal In (step S3:YES), the counter n is compared with a number Nmax that specifies a maximum number of the slave sensors 5-8 in the daisy chain on the communication buses 3a, 3b in step S4. The counter n in this situation is 1. That means, the counter n is not equal to the Nmax.

Therefore, the ID assign unit 211 outputs n-th bus switch switch-on signal for the slave sensors 5-8 in step S5. That is, when the counter n is 1, the bus switch 5b in the slave sensor 5 having the first ID assigned thereto is turned on. Then, the counter n is incremented by 1 in step S6. Then, the process returns to step S2.

In other words, when the counter n is 2, the ID assign unit 211 outputs the second ID assign signal for assignment of the second ID. In this case, because only the bus switch 5b is turned on, the channel CH1 of the ECU communication circuit 22 is coupled with the slave sensors 5 and 6. Further, because the RAM 5d in the slave sensor 5 stores the first ID, the second ID assign signal is transmitted to the slave sensor 6. Then, the sensor communication circuit 6a in the slave sensor 6 acquires the second ID. Then, the second ID is stored in the RAM 6d. Furthermore, the sensor communication circuit 6a outputs the ID acquisition signal I2 for the second ID to the ECU communication circuit 22 through the low-side communication bus 3b. In this situation, the ID bits of the second ID acquisition signal I2 are "010," and the data bits are "00001."

In this manner, when all the slave sensors 5-12 has unique ID assigned thereto, the value of the counter n becomes Nmax, and the ID assignment process concludes itself. The process also concludes itself when the ID assign unit 211 does not input the n-th ID acquisition signal In step S3 (step S3:NO). The situation where the ID assign unit 211 does not input the n-th signal is, for example, an open-circuit trouble of the bus switch 5b, a short-circuit trouble of the switch 5b or the like.

The ID assignment process with the open-circuit trouble of the bus switch 5b is now described.

In this case, the slave sensor 5 outputs the ID acquisition signal I1 to the ID assign unit 211 after acquiring the first ID in the same manner as described above. Then, in step S5, even when the switch-on signal for turning on the first bus switch 5b is outputted, the bus switch 5b cannot be turned on due to the open-circuit trouble. Then, the process proceeds to step S2 without any change, and the ID assign unit 211 outputs the second ID assign signal. However, because the bus switch 5b cannot be turned on, the communication between the ECU communication circuit 22 and the slave sensor 6 is remain blocked. Therefore, the ID assign unit 211 does not have an input of the ID acquisition signal I2 in response to the second ID assign signal. That is, in step S3, the ID assignment process concludes itself because the ID acquisition signal I2 cannot be inputted in spite of the output of the second ID assign signal (step S3:NO).

The ID assignment process with the short-circuit trouble of the bus switch 5b is now described.

In this case, the slave sensor 5 outputs the ID acquisition signal I1 to the ID assign unit 211 after acquiring the first ID in the same manner as described above. Then, because of the short-circuit trouble of the bus switch 5b, the ECU communication circuit 22 is in communication with the slave sensors 5 and 6. Therefore, the first ID assign signal from the ID assign unit 211 is inputted to both of the slave sensors 5 and 6. Therefore, the slave sensor 6 acquires the first ID, stores the first ID in the RAM 6d, and outputs the ID acquisition signal I1 to the ID assign unit 211. That is, the first ID is assigned to both of the slave sensors 5 and 6.

Then, the second and further IDs are assigned to the slave sensor 7 and further sensors. Then, in this case, even when the ID assign unit 211 outputs the fourth ID assign signal, it does not have the input of the ID acquisition signal I4. Therefore, the ID assignment process concludes itself when the ID acquisition signal I4 is not inputted in spite of the output of the fourth ID assign signal in step S3 (step S3:NO).

Then, a trouble detection process by the trouble detection unit 213 is executed in parallel with the ID assignment process. The trouble detection process is described with reference to FIGS. 5 and 6.

The maximum electric current value of the ID acquisition signal I inputted by the trouble detection unit 213 in a case where the bus switch 5b in the slave sensor 5 is having the short-circuit trouble is explained with reference to the illustration in FIG. 5. The bit data in the first row of the illustration in FIG. 5 is the ID acquisition signal I outputted by the sensor communication circuit 5a in the slave sensor 5. When the bus switch 5b in the slave sensor 5 has the short-circuit trouble, the ID acquisition signal I outputted by the sensor communication circuit 6a in the slave sensor 6 is the bit data on the second row of the illustration in FIG. 5. That is, the ID acquisition signals I outputted by both of the sensor communication circuit 5a and the sensor communication circuit 6a are the same data, when the bus switch 5b in the slave sensor 5 has the short-circuit trouble.

The ID acquisition signal I inputted by the trouble detection unit 213 takes a data form that is composed from the ID acquisition signals outputted by both of the sensor communication circuits 5a and 6a. This is because that the ID acquisition signal is an electric current signal. The signal I inputted by the detection unit 213 has, as shown on a bottom row of the illustration in FIG. 5, includes the third bit and the lowest bit having twice a magnitude of the electric current as the bit in the ID acquisition signal I outputted only by the sensor communication circuit 5a.

The trouble detection process by the trouble detection unit 213 uses above-described relationship of the ID acquisition signal I. As shown in FIG. 6 as a flowchart of the trouble detection process by the trouble detection unit 213, the process determines whether the ID assign process is started in step S11. The process concludes itself without any processing when the ID assign process has not started. When the ID assign process is determined to be started (step S11:YES), the counter n is initialized to the value of 1 in step S12. Then, the trouble detection unit 213 determines whether the n-th ID acquisition signal I is inputted by the slave sensors 5-12 in step S13.

Then, the inputted ID acquisition signal I is compared with a first threshold Th1 in step S14. In this case, the ID acquisition signal I is the digital current signal, and, as shown in the illustration in FIG. 5, the first threshold Th1 takes an electric current value that is greater than the maximum electric current value of the ID acquisition signal I that is outputted by the sensor communication circuit 5a. However, the first threshold Th1 is defined as an electric current value that is smaller than twice the value of the maximum electric current value of the ID acquisition signal I from the sensor communication circuit 5a. In addition, the comparison is preferably conducted as a comparison between the electric current value of the ID bits of the ID acquisition signal and the threshold Th1. This is because the ID bits of the ID acquisition signal I from the slave sensors 5-12 after assignment of the same ID always take the same data form.

Then, the process determines that the n-th bus switch is normal when the ID acquisition signal I inputted to the trouble detection 213 is smaller than the first threshold Th1 in step S15. In this case, because the counter n is equal to 1, the first bus switch 5b is determined to be normal. Subsequently, the process determines that the counter n is equal to the number of daisy chained slave sensors Nmax in step S16. In this case, the counter n is equal to 1, and is not equal to Nmax.

Therefore, the counter n is incremented by 1 in step S17, and the process returns to step S13. Then, the trouble detection unit 213 inputs all of the ID acquisition signals I, and the process concludes itself after determining that all bus switches 5b-12b are normal when all of the ID acquisition signals I are smaller than the first threshold Th1.

On the other hand, when the ID acquisition signal I inputted to the trouble detection unit 213 is equal to or greater than the first threshold Th1 in step S14 (step S14:NO), the ID acquisition signal is compared with a second threshold Th2 in step S18. The second threshold signal Th2 is defined, as shown in the illustration in FIG. 5, as the electric current value that is greater than twice the value of the maximum electric current value of the ID acquisition signal I outputted by the sensor communication circuit 5a and is smaller than three times the value of the maximum electric current value of the ID acquisition signal. The process proceeds to step S19 for determining that the n-th bus switch has the short-circuit trouble when the ID acquisition signal inputted to the trouble detection unit 213 is equal to or greater than the first threshold Th1 and is smaller than the second threshold Th2 in step S18 (step S18:YES). The process proceeds to step S16 for conducting the trouble detection process for all of the bus switches 5b-12b.

When the ID acquisition signal I inputted to the trouble detection unit 213 takes the electric current value that is greater than the second threshold in step S18 (step S18:NO), the process proceeds to step S20 and determines that all bus switches subsequent to the n-th bus switch have the short-circuit trouble. Then, the process proceeds to step S16 for executing the trouble detection process for all of the bus switches 5b-12b.

When the n-th ID acquisition signal In is not inputted to the trouble detection unit 213 in step S13, the process determines that the (n−1)th bus switch has the open-circuit trouble in step S21, and concludes the process itself. In this case, the n-th ID acquisition signal is determined to be not inputted when, for example, the ID acquisition signal I inputted to the trouble detection unit 213 is equal to zero for a predetermined time after the output of the ID assign signal.

The trouble detection unit 213 is capable of determining the short-circuit trouble or the open-circuit trouble of the bus switch as well as the position of those troubles.

The collision handling process by the collision process unit 212 is now described with reference to a flowchart in FIG. 7. The collision handling process starts when the process determines in step S31 whether the airbag system is in a right-after-turn-on condition where the ignition switch 14 of the vehicle has just turned on. The process proceeds to step S32 for determining whether the trouble detection unit 213 has detected a trouble when the system is in the right-after-turn-on condition (step S31:YES). Then, the process determines whether the trouble is the short-circuit trouble or the open-circuit trouble in step S33. Then, the process executes a short-circuit trouble prohibition process in step S34 when the trouble is determined to be the short-circuit trouble. The process executes an open-circuit trouble prohibition process in step S35 when the trouble is the open-circuit trouble.

In this case, the short-circuit trouble prohibition process is a process that prohibits the use of the slave sensor that includes the bus switch being determined as the position of the short-circuit trouble, and also prohibits the use of the slave sensor that is positioned on the subsequent side in the daisy chain relative to the troubled slave sensor. More practically, when the n-th bus switch has the short-circuit trouble, use of the n-th slave sensor and (n+1)th slave sensor is prohibited. When the n-th bus switch and the (n+1)th bus switch that is subsequent to the n-th bus switch have the short-circuit trouble, use of the n-th to (n+2)th bus switches is prohibited. That is, the slave sensors that are not in the scope of prohibition of use are put into use. Then, the collision process unit 212 stores information on the slave sensor of which the use is prohibited due to the short-circuit trouble.

Also, in this case, the open-circuit trouble prohibition process is a process that prohibits the use of the slave sensor that includes the bus switch being determined as the position of the open-circuit trouble, and also prohibits the use of the slave sensor that is positioned on the subsequent side in the daisy chain relative to the troubled slave sensor. For example, when the first bus switch is the position of the open-circuit trouble, use of the second slave sensor and all the slave sensors that are subsequent to the second slave sensor are prohibited. That is, the slave sensors that are not in the scope of prohibition of use, i.e., the first slave sensor in this case, are put into use. Then, the collision process unit 212 stores information on the slave sensor of which the use is prohibited due to the open-circuit trouble.

Then, when the process is in one of the following cases where (1) the short-circuit trouble prohibition process is executed in step S34, (2) the open-circuit trouble prohibition process is executed in step S35, (3) the airbag system is determined to be normal in step S32 (step S32:NO), or (4) the airbag system is determined to be not in the right-after-turn-on condition of the ignition switch 14 (step S31 :NO), the process outputs an acceleration data transmission request signal to the slave sensors 5-12 in step S36.

Then, the sensor communication circuit 5a in the slave sensor 5 inputs the acceleration data transmission request signal through the high-side communication bus 3a. Then, the sensor communication circuit 5a outputs, through the low-side communication bus 3b, acceleration data signal that includes the ID information in addition to the acceleration data detected by the sensor 5c. The same process is conducted for all of the other slave sensors 6-12. However, in this case, the process does not output the acceleration data transmission request signal to the slave sensor that is stored as the sensor under the use prohibition in step S36. That is, the collision process unit 212 outputs the acceleration data transmission request signal only to the slave sensors that are determined to be normal.

Then, the collision process unit 212 has inputs respectively from the slave sensors 5-12 in the normal condition the acceleration data signal that includes the ID information in step 37.

Then, the collision process unit 212 determines whether the collision has occurred based on the inputted acceleration data signal in step S38. Then, the process concludes itself when the collision has determined not to have occurred (step S38:NO). The process, on the other hand, outputs an ignition signal to the ignition circuit 24 in step S39 when the collision has determined to have occurred (step S38:YES).

Although the present invention has been fully described in connection with the preferred embodiment thereof with reference to the accompanying drawings, it is to be noted that various changes and modifications will become apparent to those skilled in the art.

For example, the ID bits and the data bits may have different number of bits instead of 3 bits and 5 bits.

The electric current value of the ID acquisition signal I and threshold values Th1, Th2 may take different magnitude.

The scheme of the trouble detection of the present invention may be applied to a daisy chain network of sensors and/or devices that is different from the airbag system.

Such changes and modifications are to be understood as being within the scope of the present invention as defined by the appended claims.

What is claimed is:

1. A bus communication system having a master unit and plural slave units connected to the master unit through a communication bus in a daisy chain connection, the system comprising:
   a switch device in each of the slave units for switching between connection and disconnection of communication that is established between one of the master unit and the slave unit on a preceding side of the daisy chain connection relative to the switch device and the slave unit on a subsequent side of the daisy chain connection relative to the switch device upon having an input of a switch signal outputted by the master unit;
   an ID acquisition device in each of the slave units for acquiring an ID upon having an ID acquisition signal outputted by the master unit on a condition that the switch device in the slave unit on the preceding side of the daisy chain connection is switched to connection of communication; and
   a trouble detection device in the master unit for detecting a trouble of the switch device,
   wherein the ID acquisition device outputs to the master unit an electric current response signal in response to the ID acquisition signal when the ID acquisition signal is inputted to the ID acquisition device, and
   the master unit detects the trouble of the switch device in the slave unit by using the trouble detection device based on the response signal outputted by the ID acquisition device.

2. The bus communication system as in claim 1,
   wherein the trouble detection device detects at least one of the short-circuit trouble and the open-circuit trouble in the switch device.

3. The bus communication system as in claim 1,
   wherein the slave unit is a collision detection sensor of an occupant protection system.

4. The bus communication system as in claim 2,
   wherein the trouble detection device detects the short-circuit trouble in the switch device when an electric current of the response signal has a value that is greater than a first threshold.

5. The bus communication system as in claim 2,
   wherein the trouble detection device detects a position of the open-circuit trouble of the switch device based on the electric current value of the response signal.

6. The bus communication system as in claim 4,
wherein the first threshold takes one of plural values, and
the trouble detection device detects a sequential count of the switch devices having the short-circuit trouble.

7. The bus communication system as in claim 4,
wherein the trouble detection device detects a position of the short-circuit trouble of the switch device based on the value of the electric current of the response signal.

8. The bus communication system as in claim 4,
wherein the response signal is implemented as digital data that has an ID bit, and
the trouble detection device uses an electric current value of the ID bit for detecting the short-circuit trouble.

9. The bus communication system as in claim 5,
wherein the trouble detection device determines that the switch device of the slave unit on the preceding side in the daisy chain connection relative to a response output slave unit is the position of the open-circuit trouble when the response signal is not inputted to the trouble detection device for a predetermined period on a condition that the slave unit having the ID acquisition device that is expected to output the response signal is designated as the response output slave unit.

10. The bus communication system as in claim 5 further comprising:
a prohibition enforcement unit that prohibits a use of the slave unit that is on the subsequent side in the daisy chain connection relative to a troubled slave unit that is identified as the position of the open-circuit trouble of the switch device,
wherein the prohibition enforcement unit is included in the master unit.

11. The bus communication system as in claim 7,
wherein the trouble detection device identifies the position of the short-circuit trouble as the switch device in the slave unit that includes the ID acquisition device that outputs the response signal when the response signal has the electric current value that is greater than the first threshold.

12. The bus communication system as in claim 7 further comprising:
a prohibition enforcement unit that prohibits a use of the slave unit that includes the switch device being identified as the position of the short-circuit trouble,
wherein the prohibition enforcement unit is included in the master unit.

* * * * *